United States Patent [19]

Brown

[11] Patent Number: 5,265,761
[45] Date of Patent: Nov. 30, 1993

[54] HIGH PERFORMANCE FOAM DISPENSING GUN

[75] Inventor: Daniel P. Brown, Palos Park, Ill.

[73] Assignee: Insta-Foam Products, Inc., Joliet, Ill.

[21] Appl. No.: 911,768

[22] Filed: Jul. 10, 1992

[51] Int. Cl.⁵ .............................................. B67B 7/00
[52] U.S. Cl. ....................................... 222/1; 222/145; 222/148; 239/117
[58] Field of Search ................ 222/1, 148, 145, 146.2, 222/504, 146.5, 134, 135; 239/116, 117, 118

[56] References Cited

U.S. PATENT DOCUMENTS

| | | | |
|---|---|---|---|
| 2,890,836 | 6/1959 | Gusmer et al. | 239/117 |
| 3,263,928 | 8/1966 | Gusmer et al. | 239/123 |
| 3,876,145 | 4/1975 | Gusmer et al. | 239/112 |
| 3,976,230 | 8/1976 | Sperry | 222/146 |
| 4,469,251 | 9/1984 | Sperry et al. | 222/135 |
| 4,471,888 | 9/1984 | Herb et al. | 222/137 |
| 4,523,696 | 6/1985 | Commette et al. | 222/135 |
| 4,568,003 | 2/1986 | Sperry et al. | 222/145 |
| 4,898,327 | 2/1990 | Sperry et al. | 239/1 |
| 4,993,596 | 2/1991 | Brown | 222/145 |

FOREIGN PATENT DOCUMENTS

0278849 8/1988 European Pat. Off. ............ 222/145

Primary Examiner—Gregory L. Huson
Attorney, Agent, or Firm—Lockwood, Alex, FitzGibbon & Cummings

[57] ABSTRACT

A hand held dispenser for chemical foam compositions having enhanced service life and being capable of delivering higher outputs of foam products is provided. In accordance with the invention, a dispenser cartridge is mounted in sealed movable relation to a cartridge carrier. Reliable face to face compressible seals are employed to accomplish primary porting to pressurized sources of chemical components. The dispenser cartridge does not rely on a sealed interface between a cylindrical valving rod and a dimensionally unstable TEFLON ® bushing for porting which provides improved sealing performance. Multiple porting from two or more pressurized sources of chemical components is also facilitated by the sliding seal feature.

24 Claims, 9 Drawing Sheets

HIGH PERFORMANCE FOAM DISPENSING GUN

BACKGROUND OF THE INVENTION

The present invention generally relates to hand held dispensers for mixing and dispensing reactive chemical foam compositions, such as curable polyurethane foams, useful for a number of end use applications. More particularly, it relates to a new and improved foam dispensing gun having a receiving carrier portion and a removable dispenser cartridge mounted in the carrier in sealed movable relation therewith to provide primary sealing external to the cartridge mixing chamber for controlling on/off flow of the pressurized components to provide improved sealing and dispensing performance and extended cartridge service life.

Reactive chemical foam compositions, such as curable polyurethane foams, are presently well known and used in a number of different applications. The curable foam compositions typically comprise a two-part composition and, in the case of polyurethane foams, one part of the composition includes a polyol component and the other part includes an isocyanate component. Chemical blowing agents, curing agents, catalysts or accelerators, as well as other modifying additives, may be incorporated in one or both of the component parts. These two-parts of the foaming composition are separately stored in different containers until use.

For use, the two parts of the composition are rapidly mixed together. A rapid exothermic cross linking reaction and foam expansion commences which ultimately yields a low or a high density, relatively high load bearing urethane rigid foam. Expanding chemical foams are useful in such applications as thermal insulation, in floatation, in coatings and, more recently, the foams have been used in the specialty packaging industry. The mixing of the polyol and isocyanate components must occur at a proper flow ratio and mix under rapid and sufficient impingement mixing conditions for a final acceptable product to be obtained. In the past, particularly in the precise field of building thermally insulated containers for refrigeration units or shipping containers, foam components were dispensed using static mixing equipment. The static mixers relied upon dangerous organic solvents such as methylene chloride to rinse and flush the dispenser's mixing chamber after use. Nowadays the environmental hazards of using these solvent materials renders static mixers no longer suitable for commercial foam applications and contexts.

More recently, the urethane components including the resin or polyol component and the isocyanate component are stored under pressure in returnable containers which are attached to solventless hand held impingement mixing and discharge dispensers by means of various hoses and couplings. The dispensers include a trigger operated system designed to permit the two-parts of the composition to flow into a mixing chamber wherein the products are rapidly mixed to form a reactive and expanding chemical foam composition which exits through the open end of the cartridge. In prior art dispensers, the component delivery systems extending from the pressurized storage tanks into the dispenser cartridge of the dispenser are typically multi-part systems and the potential for leakage at every joint therealong exists in the high pressure impingement mixing environment.

In these dispensers, the components are mixed by direct or indirect impingement with each other under conditions of high pressure to ensure thorough mixing. The design of the mixing cartridges has become a matter of concern in the art. The component parts of the foam composition are highly chemically reactive and begin to form cured polymeric products within a matter of seconds. Premature leaking and mixing of the components within the cartridges is a serious and major concern because leakage results in undesirable curing in the cartridge causing blockage and jamming to the cartridge in use. As a result, the cartridges have to be frequently maintained or replaced at considerable expense. Providing adequate seals within the cartridge assemblies in the high pressure environment has been another major problem to those in the art.

Prior art foam dispensers are known, for example, from U.S. Pat. No. 4,469,251, U.S. Pat. No. 4,568,003 U.S. Pat. No. 4,993,596 and from copending application Ser. No. 771,802, filed Oct. 17, 1991. In accordance with these prior dispenser arrangements, a detachable cartridge includes a mixing chamber defined in a central bore within a polymeric insert. Typically, the polymeric insert is formed of a TEFLON ® material because the reactive foam composition and its end products are not adherent to the TEFLON ® surfaces along the interior of the bore.

More particularly, the TEFLON ® insert has a central bore extending longitudinally therethrough. A plurality of openings extend through a sidewall of the insert in communication with the bore for supplying the organic resin and the isocyanate components into the mixing chamber. A valving rod is provided in a slidable interference fit within the bore to control the flow of organic polyol resin component and isocyanate component from the side openings into the mixing chamber and discharge of the foam therefrom. Secondly, the valving rod serves to clean the mixing chamber on the reverse stroke as it reseals the material supply orifices within the insert. Each of the prior art dispensers attempt to provide a primary seal to the flow of the components along the curved outer circumferential surface of the valving rod. To provide a reliable surface to surface seal along two curved cylindrical surfaces is difficult or impossible to maintain in the medium to high pressure context. Dimensions between the valving rod and the dispenser cartridge insert aperture are critical to maintain fluid tight conditions and must be kept to extremely close tolerances.

Although the inserts exhibit non-adherent surface characteristics, TEFLON ® materials are notorious for suffering from hysteresis, wear or cold flow dimensional instability. Cold flow of the TEFLON ® material causes a distortion or a change in the critical dimensions of the central bore and the side openings of the insert. In addition, friction and wear between the TEFLON ® insert and the valving rod also contribute to a loss of critical sealing dimensions for these parts. Over time this often results in a loss of the interference fit between the valving rod and the insert.

More particularly, with each activation of the valving rod, a minor film of foam product and components coats the rod. As the coating builds up on the rod, the effective diameter of the rod increases. The foam build up on the rod increases the stresses on the insert in use, leading to cold flow deformation, loss of tolerances and a loss of sealing between the rod, the core aperture and the side openings in the dispenser cartridge. This results in leakage and cross-over contamination, valving rod jamming and blockage failures in the dispenser. As a result, the ability of the valving rod to effectively seal the openings to thereby prevent leakage of the reactive components into the mixing chamber is lost. Crossovers, blockage and leakage ultimately cause obstruction within the mixing chamber which renders the dispensing cartridge generally inoperable.

In an effort to overcome the tendency of the valving inserts to undergo cold flow deformation with a consequent loss in sealing and usefulness, conventional dispenser cartridges or cartridges have been provided with means for applying a constant axial and radial compressive load against the polymeric insert member. Applying constant radial and axial loads on the insert tends to reduce some of the cold flow induced failures of the prior art nozzles. Applying a constant radial and axial load increases frictional forces developed between the valve insert and the valving rod which tends to increase the residual stresses on the insert responsible for cold flowing. Presently, the frequency of failure is still undesirably high in view of the expense associated with replacement, downtime interruptions in production and repair of the mixing chamber/dispensing cartridges. For example, a typical commercial impingement mixing hand held foam dispenser may generally only be subjected to approximately 2,000 to 3,000 dispensing activation cycles before cartridge failure is experienced.

The deficient seal-wearing performance of the prior art valving rod and TEFLON ®sleeve or bushing sealing arrangements are expected to become even more significant in the future. More particularly, the arrangement of two component entry ports set at an angled orientation with respect to each other and sealed along the surfaces of the valving rod is difficult enough for two component ports, however, modern industry regulations are presently requiring reduction or elimination of halohydrocarbon blowing agents such as CFCs, and the new substitute blowing agent systems require the addition of still a third or fourth chemical component to the impingement mixing process. This will require that structural modifications be made to the cartridge, such as making the chemical component entry ports of a larger size or diameter, as well as adding multiple ports. These modifications will only exacerbate current wear-performance problems associated with the valving rod TEFLON ® sleeve sealing arrangements currently in use.

Accordingly, to overcome the disadvantages of the prior art dispensers, it is an object of the present invention to provide new and improved foam dispensers including a dispenser cartridge design characterized by prolonged or extended use lives of more than 20,000 activation/dispense cycles.

It is another object of the present invention to provide a new and improved dispenser cartridge which does not rely upon a valving rod for providing a fluid tight seal for the reactant materials, and which does not depart from a simple low cost design.

It is a further object of the present invention to provide a dispenser cartridge arrangement which relies upon dependable external face seals to provide the primary sealing mechanism in connection with opening and closing the material flow ports of the reactive chemical components.

It is still another object of the present invention to provide a new and improved dispenser cartridge assembly wherein the valving rod primarily performs the function of purging the impingement mixing chamber of residues and provides a secondary redundant seal for the chemical component flow ports.

It is a further object of the present invention to provide a new and improved dispenser and cartridge capable of achieving higher outputs without departure from the traditional low-output design and cost.

It is another object of the present invention to provide a ne and improved foam dispenser and cartridge assembly which achieves high output levels while maintaining minimal orifice diameters in order to reduce component cross-over tendencies.

It is still another object of the present invention to provide a high output foam dispenser which subdivides the main component streams into multiple streams and separately impinges these streams at multiple sites in the mixing chamber to maximize turbulent interaction and thereby provide improved foaming performance and quality.

It is still a further object of the present invention to provide a new and improved dispenser cartridge including multiple orifices to accommodate varying numbers of components required for mixing or to increase overall output of the foam dispenser.

It is still another object of the present invention to provide multiple orifice options in a dispenser cartridge and carrier arrangement to permit the cartridge to dispense a number of variable component ratio formulations.

SUMMARY OF THE INVENTION

In accordance with these and other objects, the present invention provides a new and improved hand held dispenser for dispensing a reactive chemical foam composition. The gun in accordance with the present invention comprises in combination a gun body which includes a handle portion and a carrier portion. The carrier portion has a dispenser cartridge-receiving area defined therein which includes at least one pair of opposing spaced-apart chemical component supply ports. Each of the chemical component supply ports are designed to convey an individual chemical component under pressure from a pressurized source of the chemical component into an impingement mixing passage within the cartridge in which the components are mixed immediately prior to discharge.

A dispenser cartridge including an elongate housing having a peripheral side wall, a front discharge end with a foam discharge opening and an opposed rear end is provided. An impingement mixing passage is defined in the cartridge housing which extends rearwardly from the foam discharge opening within the housing to a point intermediate the length of the housing. At least one pair of chemical side entry ports extend through the peripheral side wall of the housing in fluid communication with the impingement mixing passage. Sealing means are provided between the peripheral side wall of the dispenser cartridge housing and the dispenser cartridge carrier area about each of the chemical side entry ports.

In accordance with the present invention, the new and improved foam dispenser also includes means for mounting the cartridge in sealed movable relation in the cartridge receiving area of the carrier. Moreover, means are provided for moving the dispenser cartridge relative to the carrier cartridge receiving area between a normally closed position wherein each said chemical component supply port is sealed by said sealing means against the peripheral side wall of the cartridge housing and an open position wherein each chemical side entry port is disposed in registering sealed relationship with each chemical supply port to permit chemicals to flow into the impingement mixing passage under pressure. The components after impingement mixing comprise a reactive chemical foam composition which is discharged out of the cartridge discharge opening. The dispenser further includes means for periodically purging chemical residues from the impingement mixing passage.

In accordance with the preferred embodiment, the receiving area of the carrier portion is defined at least in part by at least one pair of spaced-apart converging surfaces. Each of the component supply ports is disposed in a converging surface. The cartridge is provided with an external configuration which includes at least one pair of complementary spaced-apart converging surfaces. The chemical side entry ports are each disposed in a complementary converging surface, respectively. When the dispenser cartridge is mounted in the receiving area, the complementary converging surfaces on the cartridge confront the converging surfaces in the receiving area to provide a fluid-tight, face to face, seal-compressing alignment of the dispenser cartridge within the receiving area. Although converging surfaces are provided in the preferred embodiment, other arrangements may be used such as planar, diverging or round surfaces. Moreover, the alignable matched pairs of component supply ports and complementary chemical side entry ports do not have to be located on different surfaces but may also be on the same plane.

In an especially preferred embodiment, a first O-ring groove is defined about each said chemical side entry port provided in the face plane of the cartridge. A first compressible O-ring seal is disposed in each of the first O-ring grooves. Preferably, a second matching O-ring groove is defined in each complementary converging surface at a spaced location from the first O-ring groove. A second compressible O-ring is disposed in the second groove. The second O-ring groove and seal is positioned so that when the dispenser cartridge is in its closed position, the second compressible O-ring forms a fluid-tight seal about the chemical component supply port to prevent component flow. Also in accordance with the preferred embodiment, the sealing means further include a circumferentially outer raceway groove defined in each complementary converging surface surrounding each matched pair of first and second O-ring seals having a compressible raceway ring seal disposed therein. The redundant raceway seal is provided to form a fluid-tight seal between the confronting surfaces of the cartridge and the receiving area during the reciprocal movements of the dispenser cartridge between its open and closed positions.

In accordance with the present design, the sealing members must be able to withstand sliding movement of the cartridge relative to the carrier while under compression loading. Ideally, the seals should be made from a tough abrasion-resistant, chemically compatible, self-lubricating, thermoplastic elastomeric material. Preferably, the seals will be made from a fluorocarbon polymeric material. Especially preferably, the seals will comprise a vinylidene fluoride-hexafluoropropylene co-polymer.

The new and improved foam dispenser of the present invention additionally comprises means for purging residues from the impingement mixing passage after each cycle. In accordance with the preferred embodiment, the dispenser cartridge includes a counter-bored recessed portion extending inwardly from the rear end of the housing to a rear wall surface disposed intermediate the length of the cartridge housing. The rearward end portion of the impingement mixing passage is defined by a centrally disposed rod-receiving opening located in the rear wall surface.

In accordance with the present invention, an elongate valving rod is provided as the means for purging the passage which also forms the connection between the mechanical drive mechanism and cartridge. The valving rod has a forward end portion slidably received through the rod receiving opening into the impingement mixing passage. The valving rod is movable between a forward, "off" position wherein the forward end portion of the valving rod extends within the foam discharge opening at the front end of the cartridge and along the length of the impingement mixing passage and a retracted, "on" position wherein the forward end portion is spaced rearwardly from said foam discharge opening and from the chemical side entry ports within the impingement mixing passage. In its on position, the retracted valving rod permits chemical components to flow into the passage for mixing and discharge when and if the dispenser cartridge is moved or translated to its open position with respect to the receiving area of the carrier. In accordance with the invention, means are provided for reciprocatably moving the valving rod between the on position and the off position to push residues remaining in the impingement mixing passage out of the foam discharge opening and actuate the external valving design of the cartridge face seals.

In accordance with the preferred embodiment, the dispenser cartridge further includes a rear end cap releasably lockingly engaged in the rear end of the dispenser cartridge housing. The rear end cap has a central pass-through aperture disposed therein for slidably receiving a rear end portion of the valving rod. The valving rod in accordance with the preferred embodiment further includes a raised collar portion extending radially outwardly from a point intermediate the length of the valving rod. The raised collar portion has a generally solid cylindrical configuration and defines a forward bearing surface and a rearward bearing surface or shoulder. The forward bearing surface is positioned on the valving rod to abut the inner rear wall surface of the dispenser cartridge housing in face to face relationship when the valving rod is in its off position. The rearward bearing surface is positioned on the valving rod so that it will abut the rear end cap in the on position of the valving rod. In accordance with the preferred dispenser gun, the means for moving the dispenser cartridge relative to the receiving area of the carrier includes means for reciprocatably moving the valving rod in forward and rearward directions by a stroke length displacement greater than that required to move the valving rod between its on and off positions. More particularly, the valving rod will be retracted from its off position to its on position and then continuing retraction of the valving rod will cause the cartridge housing to move from its closed position to its open position relative to the carrier. Similarly, on the return stroke, as the valving rod is moved forwardly by the actuator, the valving rod will move from its on position to its off position on the cartridge, and thereafter the continuing stroke displacement will cause the cartridge housing to translate in the carrier from its open position to the closed position.

The new and improved sliding external seal design in impingement mixing foam dispensers may generally be applied to any particular mixing cartridge design known to those skilled in this art to extend the useful life of the cartridge and provide for improved sealing performance. In accordance with the preferred embodiment, a new and improved dispenser cartridge includes a machined metallic housing to define the impingement mixing passage and chemical side entry ports and a lubricating thermoplastic sleeve is provided on the valving rod to provide an improved purge function. The means for mounting the cartridge in movable sealed relation within the carrier may vary so long as effective external sealing compression is provided between the dispenser cartridge and the carrier surfaces during actuation of the valving rod and dispenser cartridge in use.

In accordance with an especially preferred aspect of the present invention, the provision of external sliding primary seals now permits multi-port impingement mixing chambers to be designed to provide high output or variable ratio embodiments or to accommodate newer, more environmentally sound, chemical foam compositions including three or more parts or components.

Other objects and advantages of the present invention will become apparent from the following Detailed Description of the invention taken in conjunction with the Drawings, in which:

DETAILED DESCRIPTION OF THE PREFERRED EMBODIMENTS

Figures 1, 2:
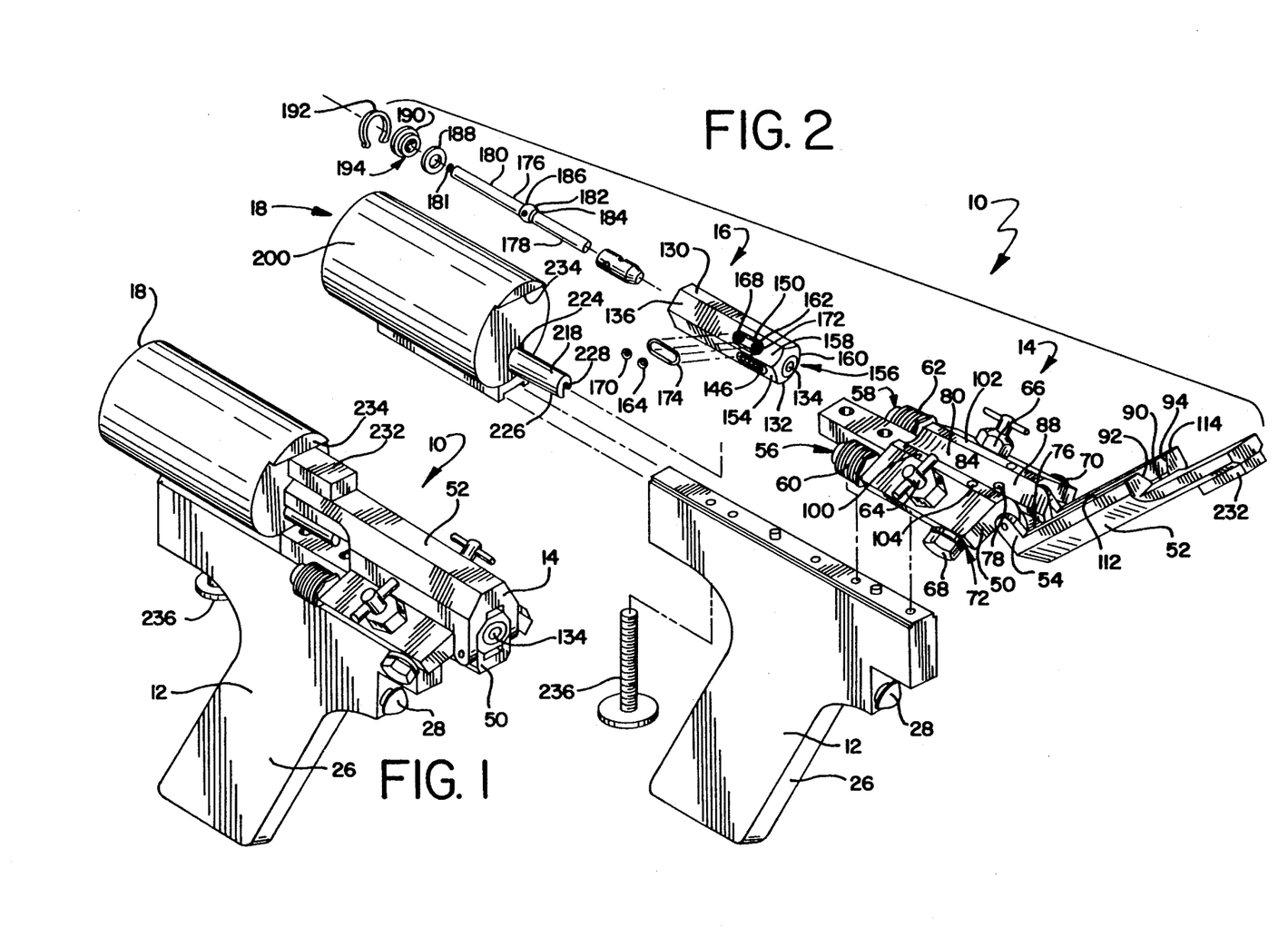
FIG. 1 is a perspective view of the new and improved hand held dispensing gun of the preferred embodiment of the invention, shown in partly-assembled forms and ready for connection to sources of supply of the chemical components and a source of compressed air to drive the air circuitry.
FIG. 2 is an exploded perspective view of the preferred foam dispensing gun in accordance with the preferred embodiment shown in FIG. 1, showing the handle portion, carrier assembly, air cylinder actuator assembly and dispenser cartridge assembly in greater detail.
Figures 3, 4:
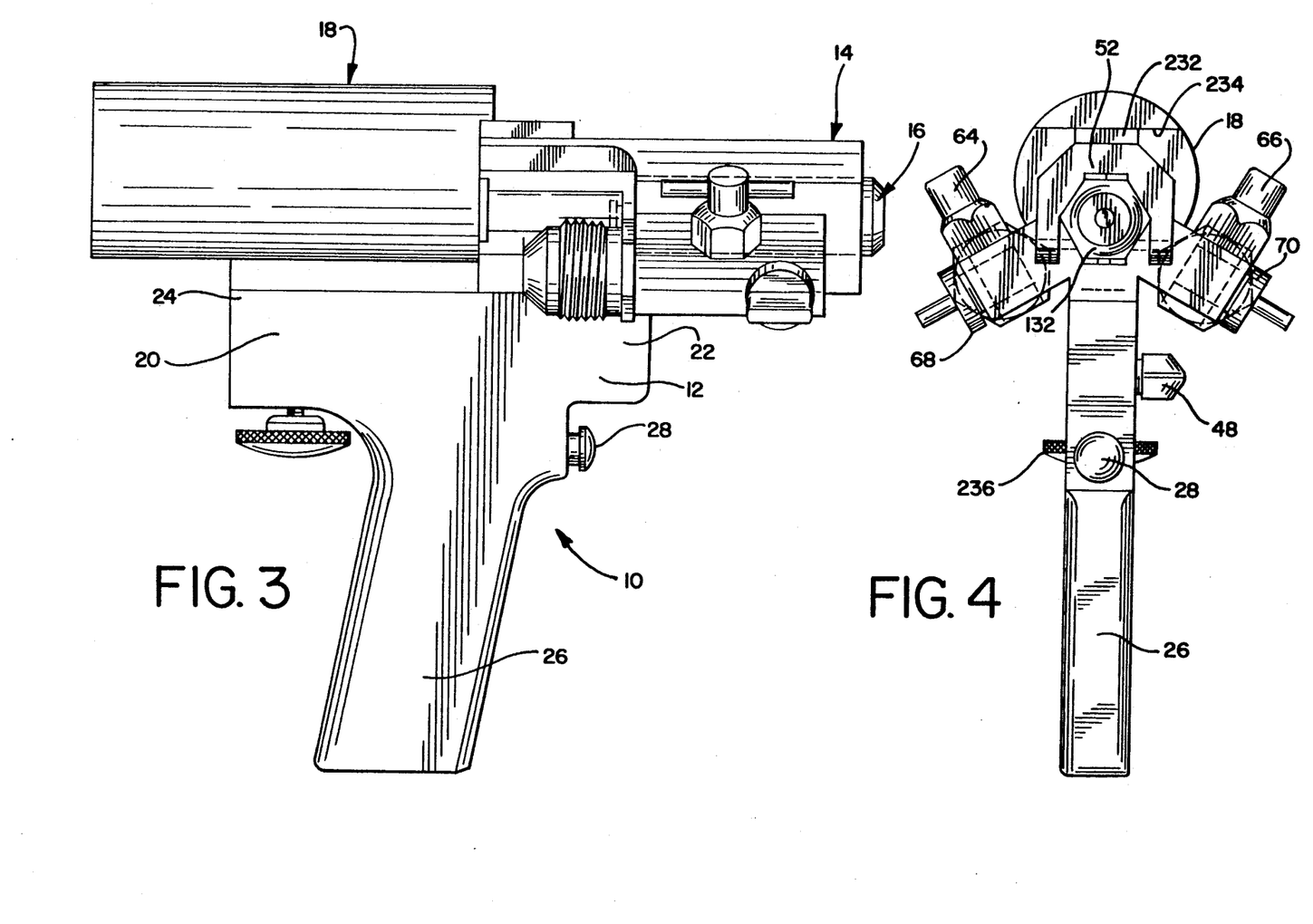
FIG. 3 is an elevated side view of the new and improved foam dispensing gun in accordance with the preferred embodiment of FIG. 1.
FIG. 4 is a front elevation view of the new and improved foam dispensing gun in accordance with the preferred embodiment of FIG. 1.

Referring now to FIG. 1, the new and improved hand held dispenser for dispensing reactive chemical foams, generally referred to by reference number 10, is shown. In the preferred embodiment depicted therein, foam dispenser 10 includes four major parts or elements in the form of a dispenser handle/body 12, a carrier subassembly 14, a dispenser cartridge subassembly 16 and an air cylinder actuator assembly 18.

Dispenser handle/body 12 includes an elongate generally rectangular upper body portion 20 having a front end 22 and an opposed rear end 24. A pistol grip handle portion 26 extends downwardly from the upper body portion 20 to provide convenient means for holding dispenser 10 in one hand. A plunger type button trigger 28, is shown projecting forwardly from the upper front surface of handle grip portion 26.

The front end 22 of upper body portion 20 includes a forward mounting portion adapted to receive the removable carrier subassembly 14 mounted to the front end 22 by means of threaded mounting screws (not shown) received in threaded screw-receiving mounting apertures defined in front end 22. Upper body portion 20 also includes a rearend 24 mounting portion adapted to receive air cylinder actuator assembly 18. A pair of downwardly stepped shoulder grooves 32, 34 extending on opposed sides of upper body portion 20 and a raised positioning pin 36 extending upwardly from upper body portion 20 are provided to cooperatively engage and mate with complementary structures defined in the bottom surface 38 of air actuator assembly 18, to positively position actuator assembly 18 onto rearend portion 24. In mounted position, pressurized air apertures 40 and 42 defined in upper body portion 20 are disposed in air-tight relation with O-ring sealed inlet-outlet apertures 44, 46 (FIG. 5) defined in bottom surface 38 for operating air cylinder actuator 18.

A pressured air inlet fitting 48 extends from upper handle grip portion 26 for delivering pressurized air to an air circuit defined within dispenser body 12. The air circuit includes the trigger 28 and each of air apertures 40 and 42. More particularly, and in accordance with well known arrangements, pressurized air from a regulated outside source enters through inlet fitting 48 and travels to a chamber within dispenser body 12. A rear stem portion of trigger 28 carrying an obstructive O-ring seal is disposed in the chamber. A pair of air passages extend from a pair of laterally spaced exit openings disposed in the chamber to air apertures 40 and 42. When trigger 28 is in its forwardly extended, closed or off position, the O-ring on the trigger shaft blocks the passage to air aperture 40 causing the forced air to exit through the unblocked passage and out through air aperture 42. When trigger 26 is squeezed moving it to an inwardly displaced, retracted or on position, the airway to air aperture 40 is opened and the airway to air aperture 42 is closed. Trigger 26 is biased, usually by means of a spring, to assume its forwardly displaced position. Accordingly, trigger 26 remains in an off position until finger pressure is applied and returns to the off position as soon as finger pressure is released. Appropriate venting paths extend in the air circuit in a conventional manner. Further details of the air circuit and trigger mechanism are provided in the above mentioned U.S. Pat. No. 4,469,251 and 4,568,003.

Referring now to FIGS. 1-6, in accordance with a preferred embodiment, carrier subassembly 14 is provided with a hinged, two-piece configuration including a lower or first carrier half 50 and an upper or second carrier half 52. Upper carrier half 52 is rotatable about pivoting hinge sections 54 to a closed position in which upper carrier half 52 overlays lower or bottom carrier half 50. Preferably, carrier halves 50 and 52 are of a unitary, one-piece construction. Carrier half 50 as shown includes integral chemical component inlet channels 56 and 58 extending from a rear end hose coupling section 60, 62 through an on/off valving block 64, 66. A threaded nut 68, 70 sealingly closes off a clean out and filter access opening 72, 73 provided for each side of the carrier valving blocks 64 and 66.

Figure 5:
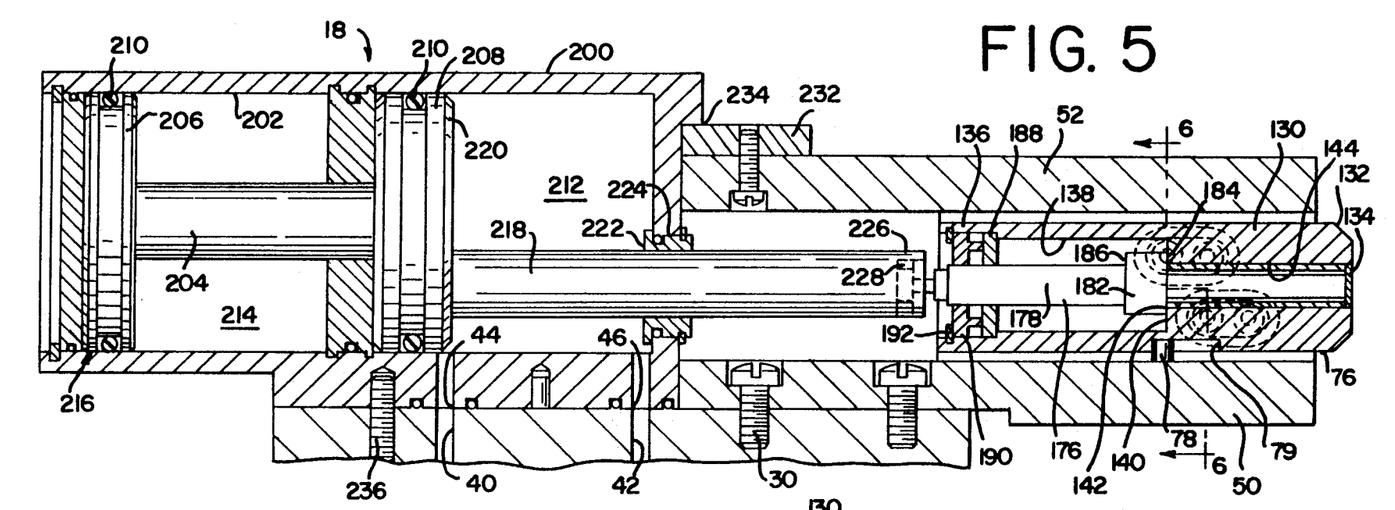
FIG. 5 is an elevated longitudinal cross-sectional view of the assembled foam gun of the preferred embodiment shown in FIG. 1, showing operative elements of said air cylinder activator assembly and the preferred dispenser cartridge assembly.
Figure 6:
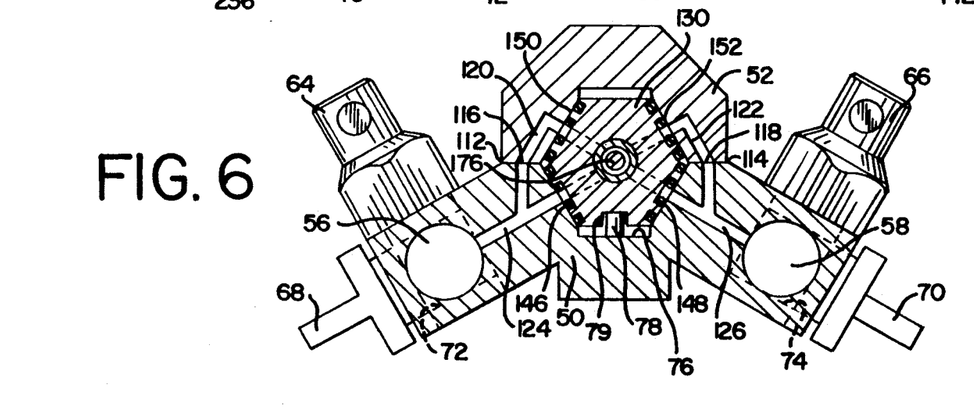
FIG. 6 is an elevated cross-sectional view of the carrier portion and dispenser cartridge assembly taken along view lines 6—6 in FIG. 5 and illustrating the multiple component inlet port design of the preferred high output foam dispenser of this invention.

In the preferred embodiment shown in FIGS. 1-6, carrier halves 50 and 52 are each provided with a three-sided, hemi-hexagonal inner wall surface configuration to define the generally hexagonal receiving area 80 for receiving dispenser cartridge subassembly 16. More particularly, lower carrier half 50 includes a flat bottom surface 76 having an upwardly projecting cylindrical positioning pin 78. Positioning pin 78 cooperates with an oval recess 79 provided on an underside surface of dispenser cartridge subassembly 16 to define forward and rearward stops for movement of the dispenser cartridge 16 within the carrier 14 to prevent over-shooting misalignments of the dispenser cartridge in the receiving area 80 of the carrier 14. Lower carrier half 50 includes a pair of spaced apart converging surfaces 82 and 84. Converging surfaces 82 and 84 each include a chemical component supply port 86 and 88 defined therein, respectively. Similarly, upper carrier half 52 also includes a flat upper surface 90 extending opposite and parallel to the lower flat surface 76 in the closed position of the carrier members 50 and 52. Upper carrier half 52 further includes a pair of spaced apart, angled, converging surfaces 92 and 94, also having chemical component entry ports 96, 98 defined therein respectively. In the high output, multi-port dispenser and carrier arrangement of this preferred embodiment as shown in FIGS. 2 and 6, bottom carrier half 50 includes a pair of upper edge surfaces 100 and 102, each provided with a branched supply port 104 and 106 having an O-ring seal 108 in a circumferential groove 110 disposed thereabout. Upper carrier half 52 has a pair of cooperating lower edge surfaces 112 and 114, each having an upper branch supply port 116 and 118 positioned for compressing O-ring seals 108 in registering alignment with ports 104 and 106 when the carrier halves 50 and 52 are moved to their abutting, closed position. In accordance with the multi-port feature of the preferred embodiment, the chemical component supply channels 56 and 58 are bifurcated as shown in FIG. 6 into an upper branches 120 and 122 and a lower branch 124 and 126, respectively. Branching permits more overall chemical quantities to be conveyed through many small orifices without significant pressure drops to provide better mixing and higher through put. The lower carrier half 50 may be mounted to dispenser body 12 by means of threaded mounting screws 128 as shown in FIG. 5. The rotatable hose coupling connections 60 and 62 permit pressurized component supply hoses (not shown) to be attached. Preferably the hoses are provided with a coaxial heater wire adjacent the coupling end to preheat the components prior to entry into the carrier assembly 14 to reduce the amount of cold foam shot released with each dispenser activation.

Referring now to FIGS. 1-6, in accordance with the preferred embodiment, a generally elongate hexagonal multi-port dispenser cartridge subassembly 16 is movably mounted in receiving area 80 in use. Dispenser cartridge subassembly 16 includes a generally six-sided hexagonal cartridge housing 130 having a front foam discharge end 132 With a centrally disposed foam discharge opening 134 and an opposed rear end 136 having a counter bored recessed area 138 extending inwardly to a rear wall surface 140. A centrally located rod-receiving opening 142 is defined in rear wall surface 140. The impingement mixing passage or chamber 144 extends between and interconnects the foam discharge opening 134 and the rod-receiving opening 142. In the high output variation embodiment shown in FIGS. 1-6, four chemical side entry ports 146, 148, 150 and 152, extend through the housing sidewalls defining complementary angled converging surfaces 154, 156, 158 and 160 and intersect and fluidly communicate with the impingement mixing passage 144.

Each of the chemical side entry ports 146, 148, 150 and 152 are provided with an outer circumferential O-ports ring groove 162 adapted to receive an O-ring 164. As shown in the FIGS. 1-6, a secondary match blind hole 166 is provided in rearwardly spaced, longitudinal alignment with each of the ports 146, 148, 150 and 152. The blind holes 166 are similarly provided with a circumferential O-ring groove 168 and O-ring 170.

The sealing assemblies in each of the complementary converging surfaces 154, 156, 158 and 160 also each include an elongated elliptical raceway groove 172 provided with a raceway O-ring 174 to surround and define the chemical entry port primary external seal areas. In a fully inserted position of the dispenser cartridge 16 in the closed carrier assembly 14, each of the various O-ring seals will be sealingly compressed between abutting confronting surfaces, such as 82 and 154, 84 and 156, 92 and 158, 94 and 160 as well as O-rings 108 between edge surfaces 100 and 112 and 102 and 114.

Dispenser cartridge subassembly 16, preferably includes a metal housing made from aluminum or steel including chemical side entry ports machined into the metal housing. Dispenser cartridge subassembly 16 further includes an elongate valving rod 176 having a front end portion 178 and an opposed rear end portion 180 with a coupling groove 182 and a raised intermediate cylindrical collar portion 182. Raised collar portion 182 defines a front facing shoulder or bearing surface 184 and a rear facing shoulder or bearing surface 186. The dispenser cartridge assembly 16 further includes a washer 188 and a rear end cap 190 secured in the rear end 136 by means of C-spring clip 192. The rear end cap 190 includes a valving rod pass-through aperture 194. The rear end cap 190 closes off the rear counter bored recess area 138. Preferably, suitable valving rod solvents and/or lubricants may be provided in the rear recess area. Moreover, a lubricating TEFLON ®-type polymeric sleeve is disposed over front end portion 178 of the valving rod 176 to prevent sticking. Finally, the positive positioning stop groove 196 is defined in a flat bottom complementary surface 198 of the housing 130 as is best shown in FIGS. 5-6 to control translational movements of the dispenser cartridge housing 130 on the position pin 78 in receiving area 80.

Referring now to FIGS. 1-5, air cylinder actuator assembly 18 includes pneumatic housing 200 defining an inner cylindrical chamber 202. A double headed piston member 204 including a rearward piston head 206 and a forward piston head 208 is mounted for slidable reciprocal movement in chamber 202. Rearward and forward piston heads 206, 208 are each provided with an O-ring type piston seal 210. Double headed piston member 2044 subdivides chamber 202 into a forward section 212, a center section 214 and a rear section 216. The double headed construction of piston member 204 doubles the power of the cylinder and provides smooth, cock-free movement of piston 204 within chamber 202. An actuator rod 218 extends forwardly from an off-center position in a forward face 220 of forward piston head 208 through a pressure seal 222 disposed in a forward opening 224 in pneumatic housing 200. The opposed free end 226 of actuator rod 218 has a valving rod coupler 228 affixed thereon adapted to cooperatively receive the rear end 180 and coupling groove 181 on valving rod 176.

Air aperture 40 in dispenser body 12 communicates with front section 212 of chamber 202 and air aperture 42 communicates with the center section 214 through sealed openings (44 and 46) in bottom surface 38 of pneumatic housing 200. Vent openings 230 are provided in rear piston head 206 to equalize the pressures in chamber sections 214 and 216. As will be appreciated by those skilled in this art, when the trigger 28 is in its forwardly displaced off position, air pressure flows from air aperture 42 into chamber sections 214 and 216 while chamber section 212 is simultaneously vented. Pressurization of rear chamber 216 causes piston 204 to move forwardly within chamber 202, causing the free end 226 of actuator rod 218 to move away from pneumatic housing 200. When trigger 28 is squeezed, chamber section 214 and 216 are vented and front chamber 212 is pressurized, driving piston 204 rearwardly in chamber 202, thereby causing free end 226 to move toward pneumatic housing 200.

In accordance with the preferred embodiment shown in FIGS. 1-6, the new and improved foam dispenser 10 of the present invention is assembled for use by mounting the carrier subassembly 14 onto upper body portion 20 by threaded mounting screws passed into mounting holes provided in lower carrier half 50. Thereafter, with the top carrier half 52 rotated to its fully open position as shown in FIG. 2, the coupling groove 181 of the valving rod 176 is slid into the coupling fitting 228 on the air cylinder subassembly 18 and both the cartridge housing 130 and the air cylinder housing 200 are placed in mounting position in the receiving area 80 and upper body portion 20, respectively. The top carrier half 52 is maneuvered to its closed position so that a mounted bearing block 232 is received under a forwardly projecting hold down ledge 234 provided in the front surface of air cylinder housing 200. Thereafter, the air cylinder housing is drawn downwardly to its fully mounted position on upper body portion 20 by a thumb screw mounting stem 236. As the air cylinder housing seats against the dispenser body the hold down ledge 234 presses the bearing block 232 and top carrier half 52 downwardly toward the bottom carrier half 50 thereby compressing the dispenser cartridge subassembly 16 into sealed relation with the receiving area 80.

Figure 6A:
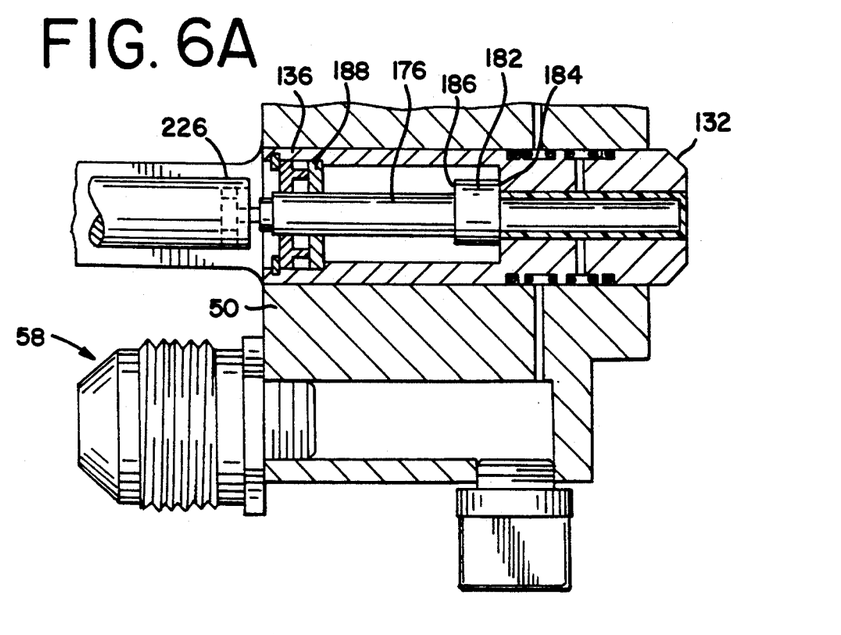
FIG. 6A is a fragmentary elevated cross-sectional view of the dispenser cartridge assembly and cartridge portion illustrating operation of the external sliding seal features of the new and improved foam dispensing gun of the invention and showing the dispenser cartridge in its full forward, normally closed position with the valving rod in its fully forward off position.

In use, the trigger 28 and air cylinder actuator assembly cause reciprocal movement of the valving rod within the impingement mixing passage 144 and cause reciprocal translational movements of the dispenser cartridge housing 130 with the receiving area 80 of the carrier. In greater detail and referring now to FIGS. 6A-6D an operating actuating sequence is illustrated. As shown in FIG. 6A, the dispenser cartridge housing 130 is shown in its full forward closed position such that blind holes 166 and their O-rings 170 are disposed in registering sealed alignment with the chemical component supply ports 86 and 88 and valving rod 176 is in its full forward off position so that the front end portion 178 completely fills the impingement mixing passage 144 and the front bearing surface 184 on collar portion 182 is pushing forwardly against rear wall surface 140. In this position, positioning pin 78 is engaged against the rear end portion of oval slot 79 in the bottom of cartridge 130.

Figure 6B:
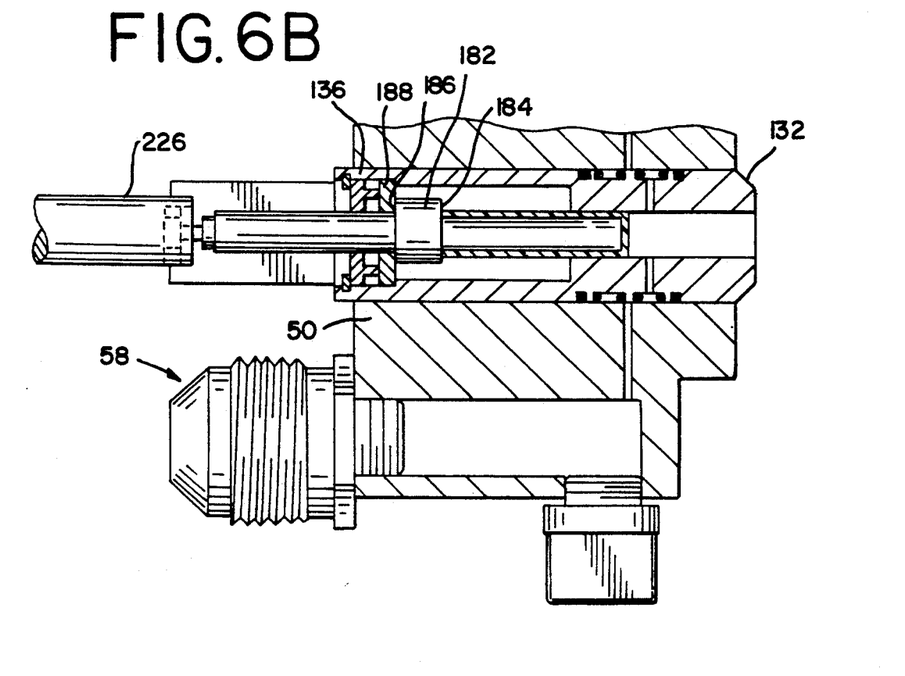
FIG. 6B is a fragmentary elevated cross-sectional view, similar to FIG. 6A, but showing the valving rod in its fully withdrawn or "on" position and wherein the dispenser cartridge housing has moved leftwardly as shown to an intermediate position part way between its closed and fully opened positions.
Figure 6C:
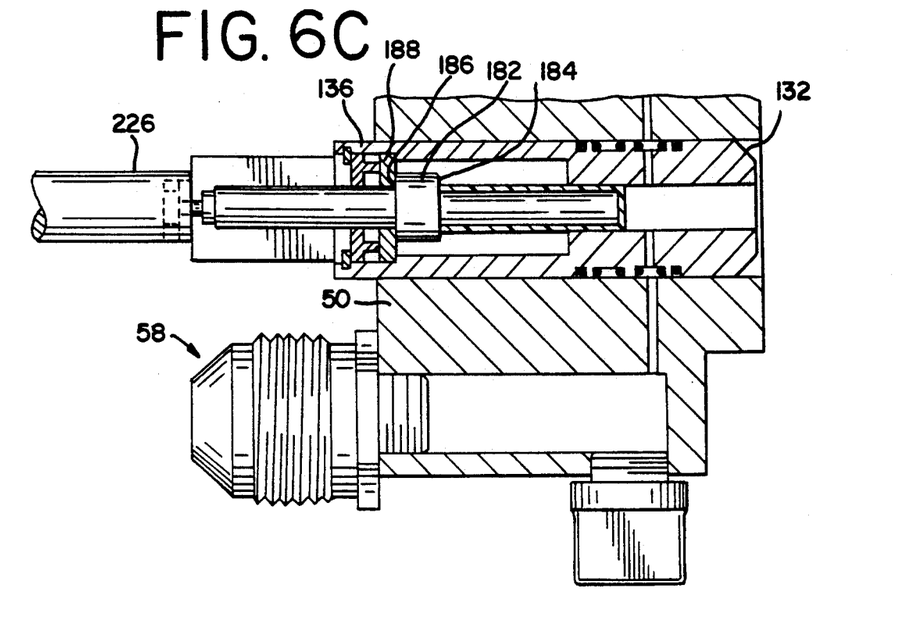
FIG. 6C is a fragmentary elevated cross-sectional view similar to FIGS. 6A–6B, but showing the dispenser cartridge in its fully retracted open position in the receiving area of the carrier and showing the valving rod in its on position.

Upon actuation of the trigger 28, the valving rod 176 is retracted to its full rearward position so that the front end 178 of the valving rod 176 is rearwardly spaced from the foam dispense opening 134 and the side entry ports 146 and 148, and so that rearward bearing surface 186 on collar portion 182 presses against rear washer 188 and rear end cap 190. Further retraction of the valving rod causes the cartridge housing to slide rearwardly in the carrier to an intermediate position as shown in FIG. 6B wherein the chemical component supply ports are not aligned with the blind holes or the chemical component entry ports. In the intermediate position illustrated in Fib. 6B, the raceway seal 174 seals the chemical components until the housing 130 is moved to its fully open position as shown in FIG. 6C. It should be mentioned that air cylinder actuation takes only a fraction of a second to accomplish that the time involved in moving the housing to the intermediate position of FIG. 6B is of a very small duration. In this position, positioning pin is located intermediate the length of oval recess 79.

As shown in FIG. 6C, the cartridge housing has been pulled back by the collar of the valving rod until the chemical component entry ports 96 and 98 are disposed in registering sealed alignment with the chemical component supply ports 86 and 88 and cartridge travel is defined and limited by post 78 in the carrier and under cut oval recess 79 in the cartridge. In the fully open and on position shown in FIG. 6C, pressurized components flow from the hose attachments through the carrier assembly into the dispenser cartridge and out through the foam dispense opening.

Figure 6D:
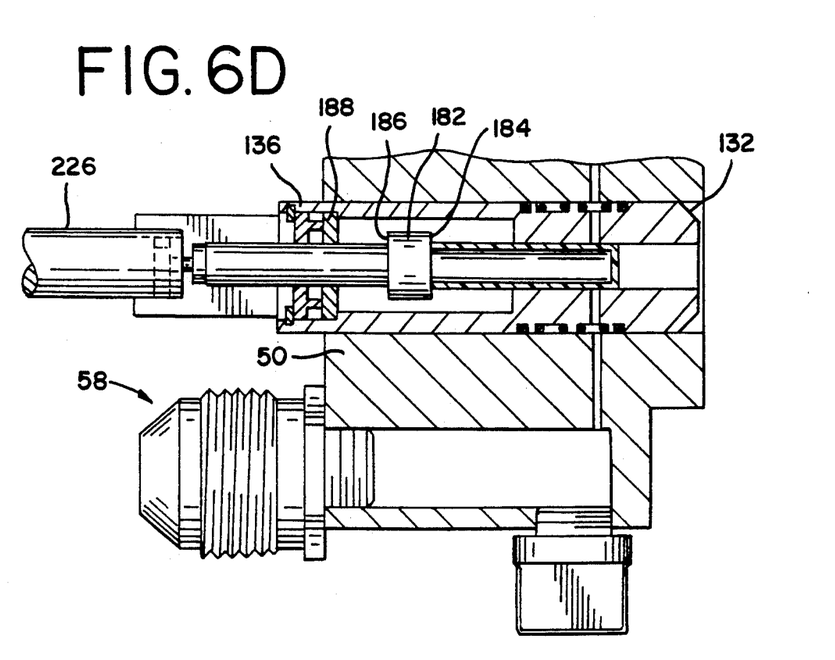
FIG. 6D is a fragmentary, elevated cross-sectional view, similar to FIGS. 6A–6C, but showing the dispenser cartridge in an intermediate position on its return stroke from its open position to the normally closed position, wherein the dispenser cartridge is shown still in its closed position relative to the carrier but the valving rod is shown in an intermediate position between its retracted on position and its fully extended forward or off position.
Figures 7, 8:
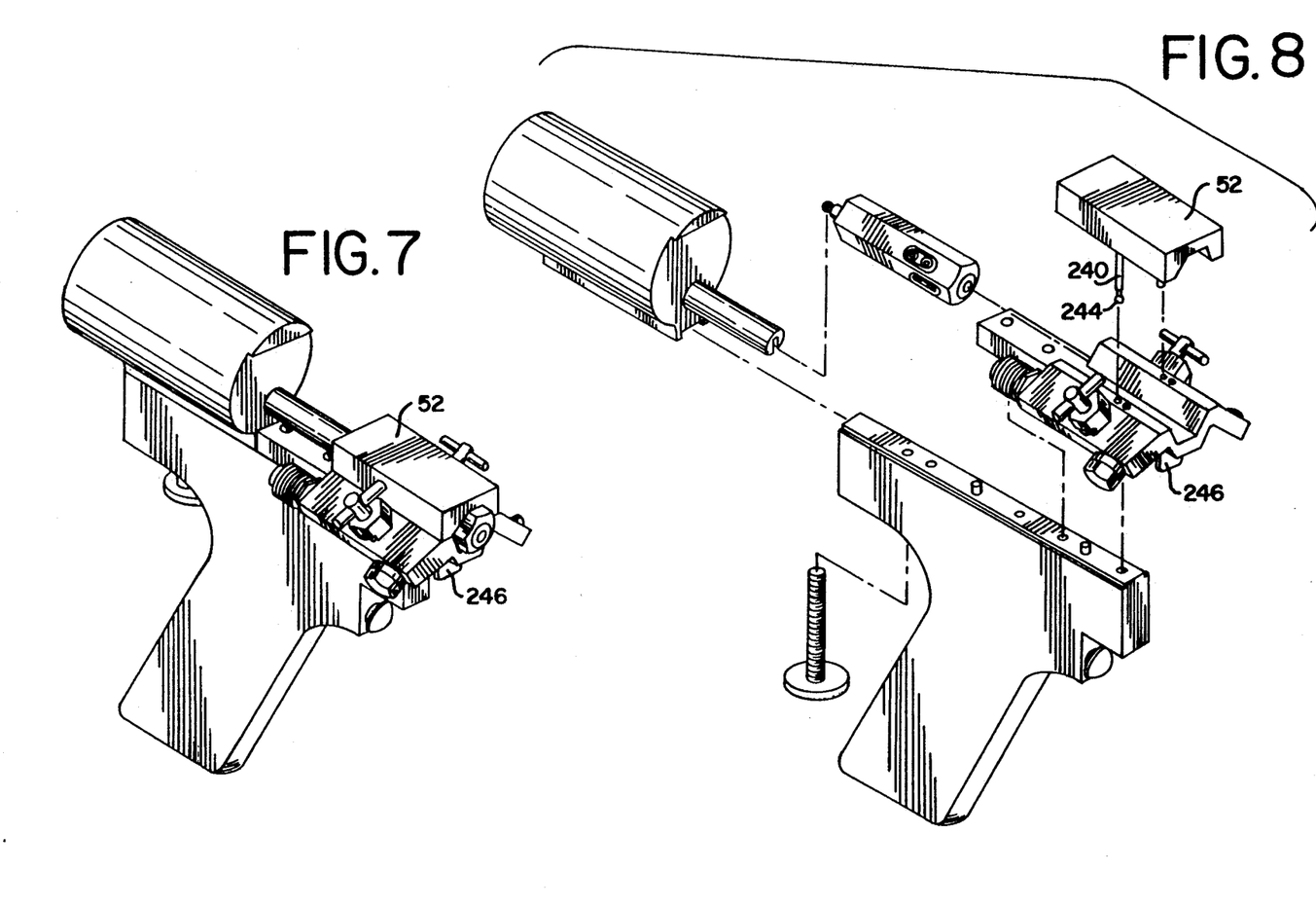
FIG. 7 is a perspective view of an alternate embodiment of the new and improved foam dispensing gun of the present invention illustrating a two-piece carrier with a rotatable cam locking mechanism.
FIG. 8 is an exploded perspective view of the alternate embodiment foam gun shown in FIG. 7.
Figure 9:
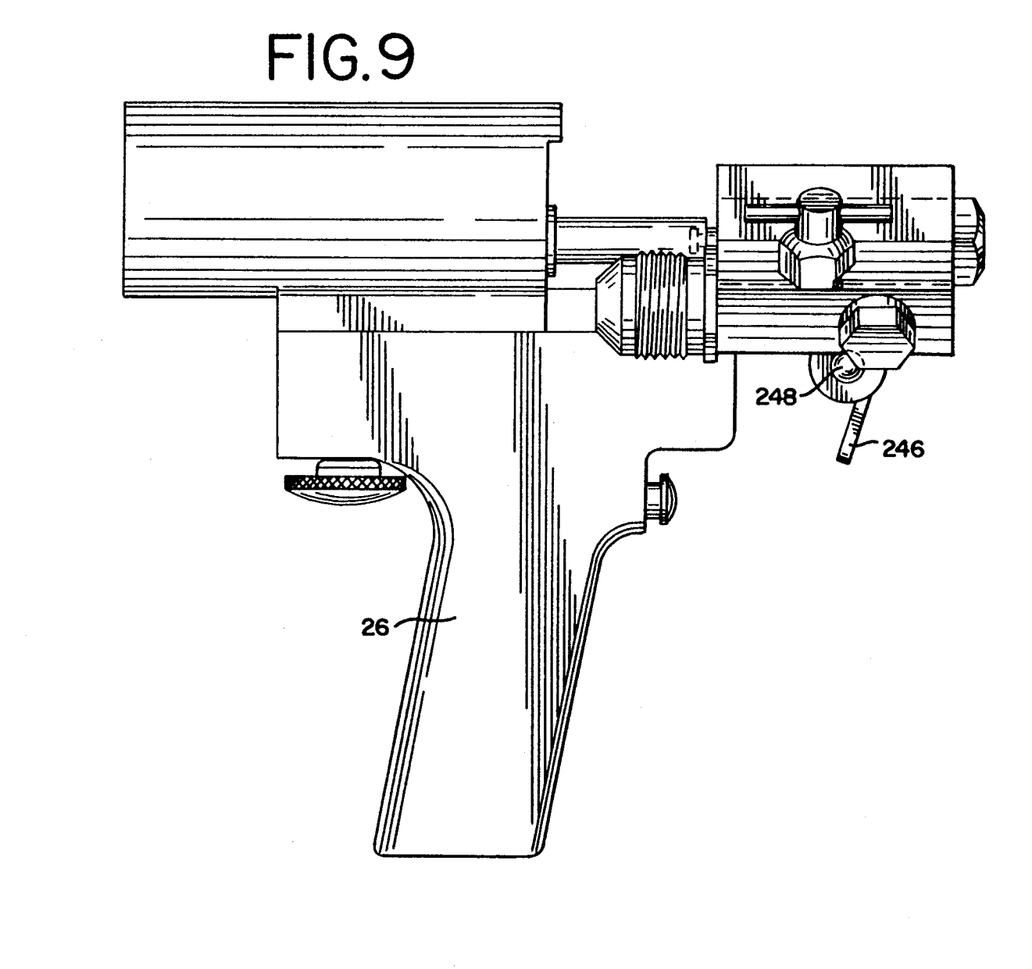
FIG. 9 is a side elevation view of the alternate embodiment foam gun shown in FIGS. 7–8.
Figure 10:
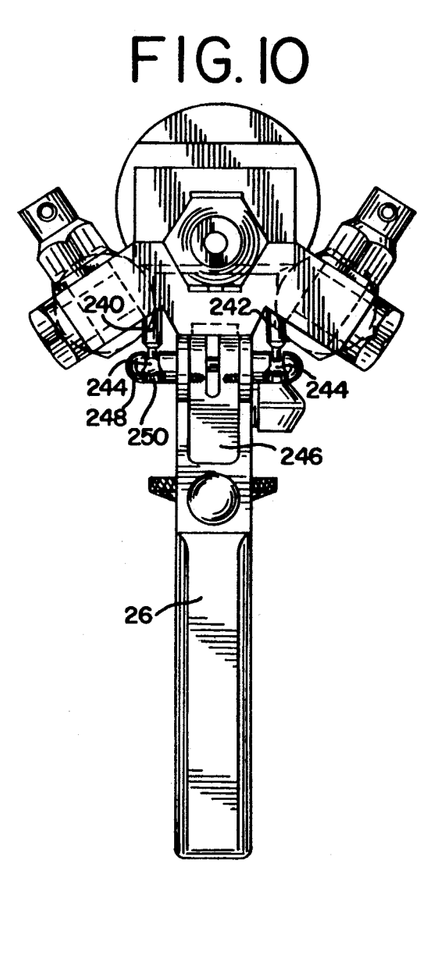
FIG. 10 is a front elevation of the alternate embodiment of FIGS. 7–9.
Figure 11:
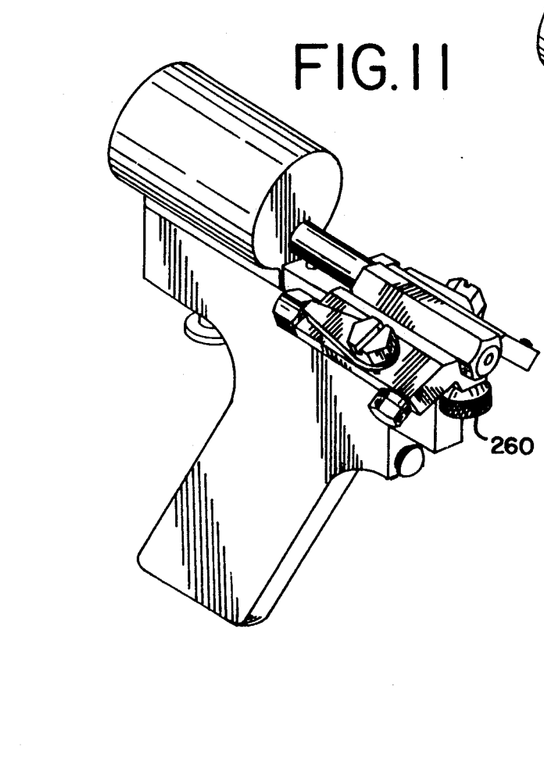
FIG. 11 is a perspective view of still another alternate embodiment of the new and improved foam dispensing gun in accordance with the present invention illustrating another method for movably mounting the dispenser cartridge in sealed slidable relation in the carrier.
Figure 12:
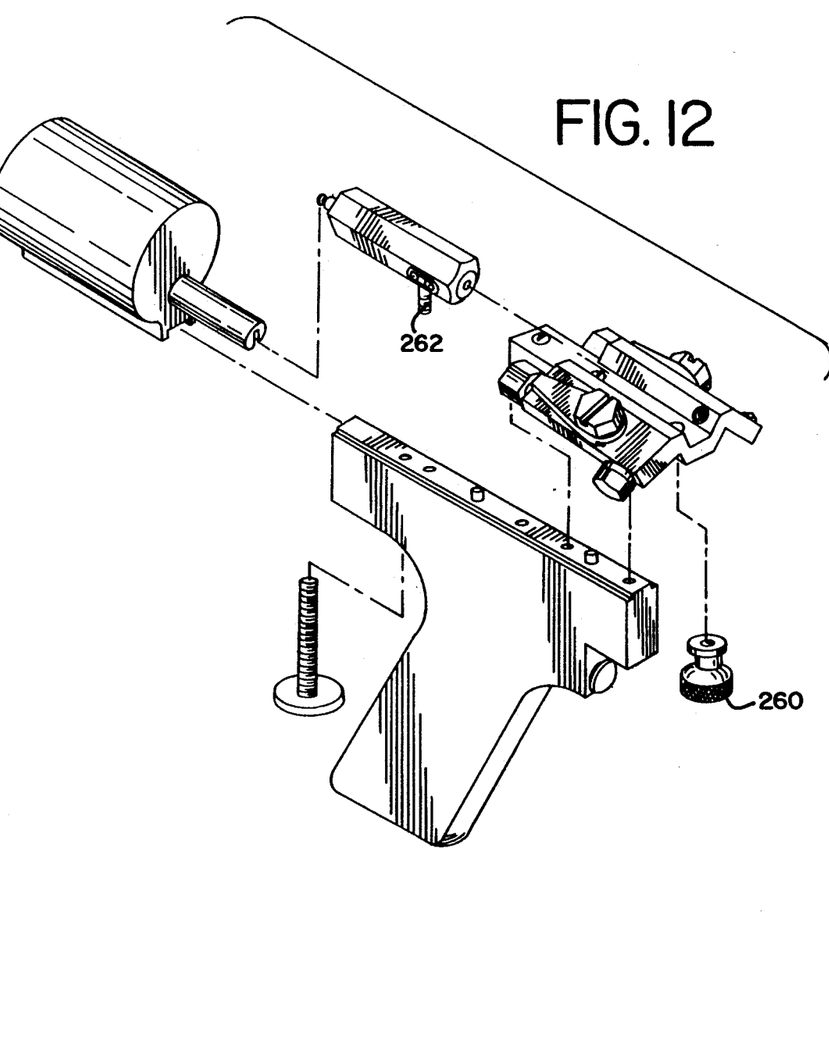
FIG. 12 is an exploded perspective view of the alternate embodiment shown in FIG. 11.
Figure 13:
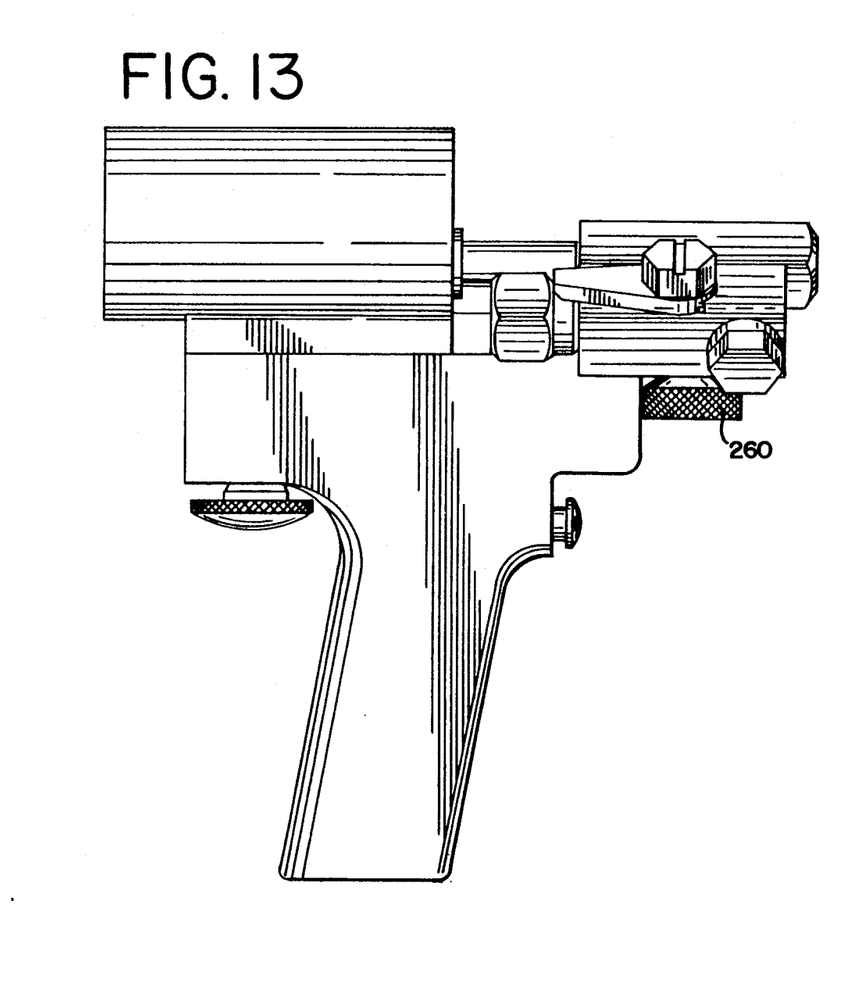
FIG. 13 is a side elevation view of the alternate embodiment shown in FIGS. 11–12.
Figure 14:
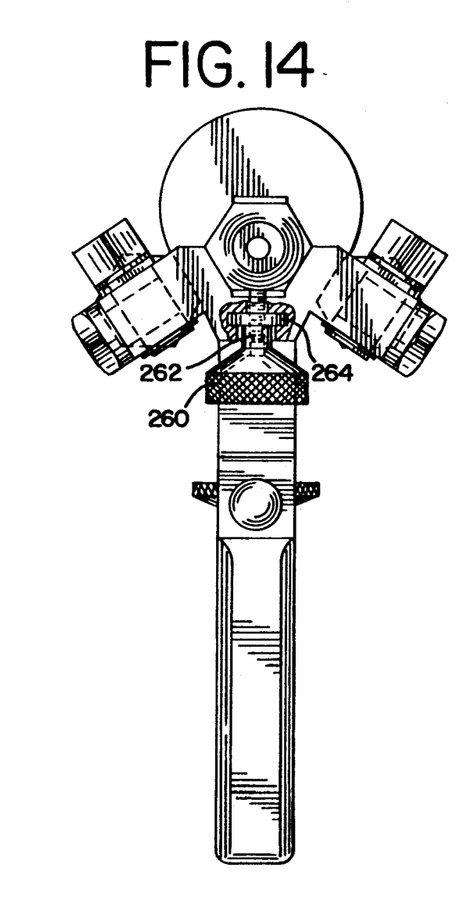
FIG. 14 is a front elevation view of the alternate embodiment shown in FIGS. 11–13 with portions thereof shown in section to illustrate the sliding stem and coupling nut mounting in accordance with this alternate embodiment.

In FIG. 6D, the dispenser subassembly is shown at the early stages of the return stroke of the valving rod 176 and housing 130 wherein the valving rod 176 is moving forwardly to push out the contents of the impingement mixing passage 144 as the forward bearing surface 184 pushes against the rear wall surface 140 to move the supply port 86 and 88 once again in alignment with the blind holes 166. In the closed and off position shown in FIG. 6A, there is no pressure from the material at the orifice-valving rod interface and thus no pressure drive at that location to cause a leak at that point adjacent each of the intersections of the side entry ports 96, 98, 146, 148 with the impingement mixing passage 144.

As has been mentioned above, the O-ring seals 164, 170 and 174 should be made from a tough abrasion resistant thermoplastic elastomer. A preferred material is a co-polymer of vinylidene fluoride with hexafluoropropylene sold under the tradename VITON ® available from E. I. duPont deNemours & Company.

In accordance with the preferred embodiment shown in FIGS. 1–6, better sealing and better repeated cycling performance is provided by the dispenser cartridge subassembly 16 having fewer parts than conventional dispensers. The dispenser 10 has been tested and used continuously in excess of 20,000 activation cycles and often as high as 30,000 cycles without exhibiting cross over contamination or leakage problems. The sliding external sealing method and arrangement may also be combined with different dispenser cartridge designs to provide improved sealing performance and prolonged use lives.

In accordance with the invention, mounting means are provided to mount the dispenser cartridge assembly 16 within the carrier subassembly 14 in sealed movable relation therewith. Instead of the hinged clam shell clamping means shown in FIGS. 1–6, a separable two-piece carrier and quick-disconnect arrangement may be used as shown in the alternate embodiment depicted in FIGS. 7–10.

In accordance with the alternate embodiment shown in FIGS. 7–10, top carrier half 52 includes a pair of depending mounting legs 240, 242 having a spheroidal end portion 244. The mounting legs are receivable through apertures provided in lower carrier half 50. A rotatable quick-disconnect nut 246 attached to a rotatably mounted cam shaft 248 is positioned to receive the spheroidal ends of mounting legs 240 and 242 into cam grooves 250 on cam shaft 248. Rotation of nut 246 causes the cam shaft 248 to rotate pulling spheroidal ends 244 downwardly an incremental amount sufficient to cause the carrier to compress all of the O-rings within the carrier and dispenser assembly.

Still another embodiment of an alternate mounting method is shown in FIGS. 11–14. As depicted therein, a simpler two-port cartridge and carrier embodiment 260 is provided. A bottom mounted threaded coupling shaft 262 is threaded into a tapped receptacle on the underside of the dispenser cartridge. Rotation of the coupling shaft draws the cartridge into the receiving area until the complementary converging surfaces of the cartridge confront the converging surfaces on the carrier in abutting seal compressing contact. The coupling shaft 262 passes through an elongate oval shaped slot 264 defined in the bottom of the carrier to permit the sealed cartridge to slide within the carrier to open and close the cartridge as in earlier described embodiments.

Each of the above-mentioned patents and applications are specifically incorporated herein by reference.

Although the present invention has been described with reference to certain preferred embodiments, modifications or changes may be made therein by those skilled in this art without departing from the scope and spirit of this invention as defined by the appended claims.

I claim:

1. A hand held dispenser for dispensing a reactive chemical foam composition, said dispenser comprising, in combination: a dispenser body including a handle portion and a carrier portion having a dispenser cartridge-receiving area with at least one pair of chemical component supply ports defined therein, each of said component supply ports conveying an individual chemical component under pressure from a pressurized source of the chemical component into an impingement mixing passage in which said components are mixed immediately prior to discharge, a dispenser cartridge including an elongated housing having a peripheral side wall, a front discharge end with a foam discharge opening and an opposed rear end, said impingement mixing passage extending rearwardly from said foam discharge opening within said housing to a point intermediate the front discharge end and said rear end, at least one pair of chemical side entry ports extending through said peripheral side wall in fluid communication with said impingement mixing passage, sealing means disposed between said peripheral side wall and said dispenser carrier receiving area about each said chemical side entry port, means for mounting said dispenser cartridge in sealed movable relation in said cartridge receiving area, means for moving said dispenser cartridge relative to said receiving area between a normally closed position wherein each said chemical component supply port is sealed by said sealing means against the peripheral side wall of said housing and an open position wherein each chemical side entry port is disposed in registering sealed relationship with a said chemical component supply port thereby permitting chemical components to flow into said passage under pressure for impingement mixing and discharge; said dispenser further including means for periodically purging residues from said impingement mixing passage.

2. A foam dispenser as defined in claim 1, wherein said receiving area is defined at least in part by at least one pair of spaced apart converging surfaces, each of said component supply ports being disposed in a said converging surface, said dispenser cartridge having an exterior configuration including at least one pair of complementary spaced apart converging surfaces, each said chemical side entry port being disposed in a said complementary converging surface, whereby when said dispenser cartridge is positioned in said receiving area, the complementary converging surfaces on the cartridge confront the converging surfaces of the receiving area to provide a fluid-tight, face-to-face, seal-compressing alignment of the dispenser cartridge within the receiving area.

3. A foam dispenser as defined in claim 1, wherein said sealing means comprises a shaped sealing member of a tough, abrasion resistant, self-lubricating, thermoplastic elastomeric material chemically compatible.

4. A foam dispenser as defined in claim 3, wherein said sealing means comprises a fluorocarbon polymeric material.

5. A foam dispenser as defined in claim 4, wherein said fluorocarbon polymeric material comprises a vinylidene fluoride-hexafluoropropylene copolymer.

6. A foam dispenser as defined in claim 2, wherein said complementary converging surfaces on the dispenser cartridge include a first O-ring groove defined about each said chemical side entry port and said sealing means includes a first compressible O-ring seal disposed in each said first O-ring groove.

7. A foam dispenser as defined in claim 6, wherein said sealing means additionally comprises a second matching O-ring groove defined in each said complementary converging surface having a second compressible O-ring disposed therein spaced from said chemical side entry ports and positioned such that when the dispenser cartridge is in said closed position, the second compressible O-ring forms a fluid tight seal about the chemical component supply port.

8. A foam dispenser as defined in claim 7, wherein said sealing means further comprises a radially outer circumferential raceway groove defined in each said complementary surface surrounding said first and second O-ring grooves and a compressible raceway ring seal disposed in said raceway groove for forming a fluid tight seal between the confronting surfaces of the cartridge and the receiving area during reciprocal movements of the dispenser cartridge between said open and said closed positions.

9. A foam dispenser as defined in claim 2, wherein said complementary converging surfaces on said dispenser cartridge include a seal-receiving recess surrounding each said chemical side entry port and said sealing means comprises a substantially planar gasket configured to be received in said recess having a through hole aperture defined therein positioned for registration with a said chemical side entry port.

10. A foam dispenser as defined in claim 1, wherein said means for mounting the dispenser cartridge in sealed movable relation in said receiving area includes clamping means.

11. A foam dispenser as defined in claim 1, wherein said mounting means includes a threaded mounting stem extending from said dispenser cartridge receivable through an aperture extending through said carrier portion and a rotatable threaded coupling nut engagable on a free end of said mounting stem for drawing the dispenser cartridge into said receiving area so that said confronting converging surfaces are disposed in abutting face-to-face contact so that the sealing means are compressed to form a leak-free fluid-tight seal.

12. A foam dispenser as defined in claim 1, wherein said means for moving said dispenser cartridge relative to the receiving area includes means for defining forward and rearward stops to limit travel of the dispenser cartridge during movement of the cartridge to its closed position and to its open position, respectively, such that in said open and closed positions the first and the second O-ring seals on the dispenser cartridge are positively positioned in registering alignment about said component supply port.

13. A foam dispenser as defined in claim 1, wherein said dispenser cartridge further includes a counter bored recessed portion extending inwardly from said rear end to a rear wall surface disposed intermediate the length of the cartridge and said impingement mixing passage being defined at a rearward end by a rod-receiving opening centrally disposed in said rear wall surface.

14. A foam dispenser as defined in claim 13, wherein said means for periodically purging residues includes an elongate valving rod having a forward end portion slidably received through said rod-receiving opening into said passage, said valving rod being movable between a forward off position wherein the forward end portion extends within the foam discharge opening and along the length of said passage and a retracted on position wherein the forward end portion is spaced rearwardly from said foam discharge opening and said chemical side entry ports within said passage thereby permitting chemical components to flow into said passage for discharge when said cartridge is moved to its open position and means for reciprocatably moving the valving rod between said on position and said off positions to push residues remaining in said passage out said foam discharge opening.

15. A foam dispenser as defined in claim 14, wherein said dispenser cartridge further includes a rear end cap releasably lockingly engaged in said rear end having a central aperture disposed therein for slidably receiving a rear end portion of said valving rod, said valving rod further including a raised collar portion extending radially outwardly from a point intermediate the length of said valving rod and defining a forward bearing surface and a rearward bearing surface, said forward bearing surface being positioned to abut said rear wall surface in the off position of the valving rod and said rearward bearing surface being positioned to abut said rear end cap in the on position of the valving rod and said means for moving the dispenser cartridge relative to said receiving area includes means for reciprocatably moving the valving in forward and rearward directions by a stroke displacement greater than required to move the valving rod between its on and off positions.

16. A foam dispenser as defined in claim 15, wherein the means for moving the valving rod and dispenser cartridge comprises an air cylinder having at least one reciprocatable piston disposed therein, means defining an air circuit for operating said at least one piston, trigger means for controlling the air cylinder and piston and means for connecting said at least one piston to said rearward end portion of said valving rod.

17. A foam dispenser as defined in claim 2, wherein said receiving area has a two sided 90° V-groove configuration with a central apex and said dispenser cartridge has a 90° corner portion between the two said complementary converging surfaces and said corner is received in said apex.

18. A foam dispenser as defined in claim 2, wherein said receiving area has a three-sided hemi-hexagonal configuration including a flat horizontal surface separating said two converging surfaces and said dispenser cartridge housing has a complementary three-sided hemi-hexagonal portion.

19. A foam dispenser as defined in claim 7, wherein said dispenser cartridge has a length dimension defined between said front discharge end and said rear end and each pair of said first and second O-ring grooves are disposed in spaced apart longitudinal alignment on said complementary converging surfaces.

20. A foam dispenser as defined in claim 2, wherein each said converging surface includes more than one component supply port and each said complementary converging surface includes a corresponding plurality of chemical side entry ports defined therein.

21. A foam dispenser as defined in claim 2, wherein said carrier portion includes first and second halves each carrier half including a said receiving area and said dispenser cartridge having two pairs of said complementary converging surfaces.

22. A foam dispenser as defined in claim 21, wherein chemical component supply ports are disposed in the receiving area of said first carrier half and the chemical side entry ports of the dispenser cartridge are disposed in the complementary converging surfaces confronting said first carrier half.

23. A foam dispenser as defined in claim 21, wherein chemical component supply ports are disposed in the receiving areas of both of said first and second carrier halves and the chemical side entry ports are disposed in each of the complementary converging surfaces of the dispenser cartridge confronting both the first and the second carrier halves.

24. In a foam dispenser of the type including a separable dispenser cartridge including an impingement mixing chamber wherein chemical components are introduced and mixed under pressure prior to discharge and a carrier member having a receiving area for receiving the dispenser cartridge, a valving rod movable within the impingement mixing chamber to open and close chemical component entry ports thereby permitting the chemical components to be discharged from the foam dispenser, the method for sealing the pressurized chemical components to provide a leak-free discharge arrangement, said method comprising providing a chemical component supply port for each component in the receiving area, providing a chemical component entry port for each component in the dispenser cartridge, said component entry ports being disposed in fluid communication with said impingement mixing chamber, providing an abrasion resistant, face to face sealing means intermediate the dispenser cartridge and the carrier adjacent the chemical component supply ports and chemical component entry ports and moving the dispenser housing relative to the receiving area so that the component supply ports and the chemical component entry ports are alternately disposed in registering sealed relation to each other and disposed in non-registering sealed relation against adjacent surface portions on the dispenser cartridge and the receiving area, respectively.

* * * * *